A. Q. ROSS.
Toy Galloping-Horse and Carriage.

No. 209,777. Patented Nov. 12, 1878.

UNITED STATES PATENT OFFICE.

ABBOTT Q. ROSS, OF CINCINNATI, OHIO.

IMPROVEMENT IN TOY GALLOPING HORSE AND CARRIAGE.

Specification forming part of Letters Patent No. 209,777, dated November 12, 1878; application filed March 26, 1878.

*To all whom it may concern:*

Be it known that I, ABBOTT Q. ROSS, of Cincinnati, Hamilton county, and State of Ohio, have invented an Improvement in Toy Galloping Horse and Carriage, of which the following is a specification:

This invention relates to a toy horse and carriage in which the propulsion of the carriage is accompanied by a galloping motion of the horse, and to that species of such a rig in which the muscular force of the child is applied to the horse, and through it transmitted to the driving wheel or wheels for propelling the carriage.

My improvement consists in providing such means for galloping the horse that the child will be enabled to apply power on the descending as well as on the rearing motion of the horse.

Figure 1:
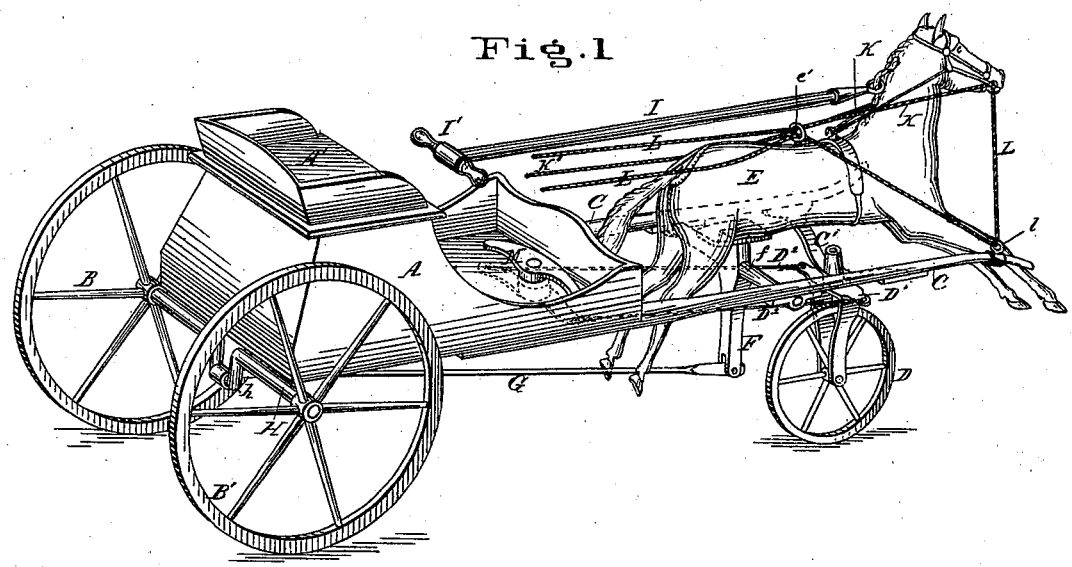
Figure 2:
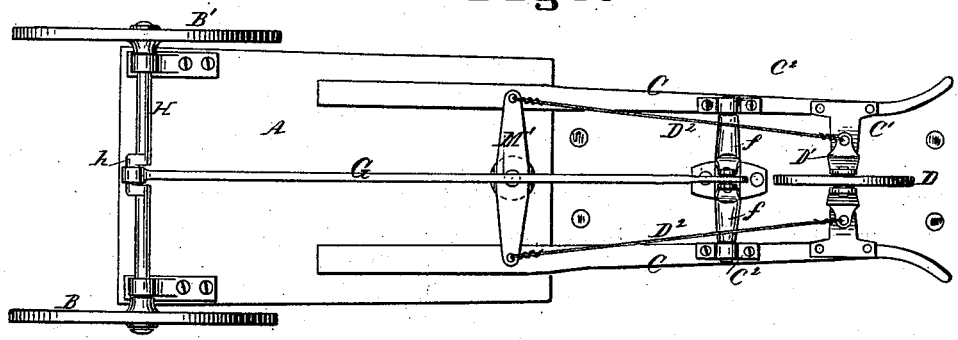

In the accompanying drawings, Figure 1 is a perspective view of a toy galloping horse and carriage, showing my improvement in two forms. Fig. 2 is a bottom view of the carriage.

The same letters of reference are used in the designation of identical parts in all the figures.

The box A of the carriage is mounted on two wheels, B and B', one of which is fixed on the axle H, for propelling purposes, while the other may be loose thereon, to facilitate turning corners.

The box carries a suitable seat, A', to be occupied by the child. It is also provided with rigid thills C, which are connected together near their extremities by a stiff cross-bar or bracket, $C^1$. This bracket $C^1$ is curved downward, as clearly shown, in order to admit of the mounting of the horse E in the natural position between the thills, and yet admit of its galloping motion without interfering with said bracket. The front ends of the thills are supported upon the swiveling wheel D, the frame of which is journaled in the bracket $C^1$. The horse E is mounted between the thills upon the upper end of the upright bar F, the horizontal arms $f$ of which are supported to turn in hangers or bearings $C^2$ on the thills.

The lower end of bar F is connected by a rod or pitman, G, to a return-crank, $h$, of axle H. It will be observed that a rocking or galloping motion of the horse will impart a rotary motion to the cranked axle, so as to propel the carriage.

In United States Letters Patent No. 186,880, granted to me January 30, 1877, I describe the use of reins for applying power to the horse in one direction. The means now shown are adapted to give a positive rocking or galloping motion to the horse, as power can be transmitted thereby to move the horse both up and down. For this purpose I prefer to employ a stiff rod, I, hooked to the neck of the horse and extending back to near the seat, where it terminates in a cross-bar, I', to be taken hold of by the child on the seat. By alternately pulling and pushing on the rod I the required rocking motion can be given to the horse. The same object may be accomplished by means of two sets of reins. One set, K K, thereof is permanently secured to the rings of the bit, and may unite in a single line, K', to reach directly to the seat of the carriage. By pulling on this line the horse will be made to rear. The forward ends of the other set, L L, are also secured to the rings of the bit, from which they pass first through eyes $l$ on the respective thills C, and then through a terret or terrets, $e'$, on the back of the horse, extending back to the seat. By pulling on these reins L L the forward end of the horse will be drawn down. The rocking or galloping motion will thus be imparted to the horse by alternately pulling on the reins K K and L L.

The swiveling wheel D is the steering-wheel, the frame of which has a steering-bar, $D^1$, from opposite ends of which rods $D^2$ $D^2$ reach to connect onto the respective ends of a lever, M', centrally fulcrumed under the box of the carriage. To the fulcrum-pin or journal of lever M' is secured the foot-bar M, which is in a convenient position to be operated by the feet of the child sitting on the seat of the carriage.

The mechanism for transmitting motion from the horse to the driving-wheels of the carriage and the steering devices may be greatly varied without affecting the principle of my invention.

What I claim as my invention, and desire to secure by Letters Patent, is—

1. In a toy galloping horse and carriage, the combination, substantially as specified, of the pivoted horse and the driving means attached to the horse's head or neck, reaching thence to the seat, for imparting a positive rocking motion to such horse from the seat of the carriage.

2. In a toy galloping horse and carriage, the combination, substantially as specified, of the pivoted horse and the stiff driving-rod attached to the horse's head or neck, for imparting a positive rocking motion thereto from the seat of the carriage.

3. In a toy galloping horse and carriage, the combination, substantially as specified, of the pivoted horse, the stiff thills, and the bracket for rigidly connecting the front ends of the thills, said bracket being curved to admit of the galloping motions of the horse.

In testimony of which invention I hereunto set my hand.

ABBOTT Q. ROSS.

Witnesses:
JOHN E. JONES,
J. L. WARTMANN.